May 5, 1931.                    A. C. KELLER                    1,804,168
          METHOD OF AND MEANS FOR DETERMINING CYCLIC
                VARIATIONS IN A ROTATING MEMBER
                       Filed Feb. 10, 1928

INVENTOR:
ARTHUR C. KELLER
By G. M. Campbell
ATTORNEY

Patented May 5, 1931

1,804,168

UNITED STATES PATENT OFFICE

ARTHUR C. KELLER, OF NEW YORK, N. Y., ASSIGNOR TO BELL TELEPHONE LABORATORIES, INCORPORATED, OF NEW YORK, N. Y., A CORPORATION OF NEW YORK

METHOD OF AND MEANS FOR DETERMINING CYCLIC VARIATIONS IN A ROTATING MEMBER

Application filed February 10, 1928. Serial No. 253,251.

This invention relates to a method of and apparatus for determining variations in the movement of a rotating member and its object is to provide a method of and means by which any variation in the turning movement of a rotating member in one complete cyclic rotation may be determined.

To accomplish this object movement of the rotating member under test is employed to cause generation of an electromotive force of a predetermined wave form which may be recorded and any variation in the cyclic rotation of the member noted by noting the variations of the wave from the predetermined form.

In general the apparatus employed to accomplish the desired object comprises a magnet structure and an electrical pick-up coil one of which may be carried by the rotating member and the other held stationary relative thereto so that the magnetic field of the magnet structure is cut by the pick-up coil due to the turning movement of the rotating member and an electromotive force is generated which may be noted or recorded by suitable apparatus and any variations in the movement of the rotating member under test determined.

The electrical current generated in the pick-up coil may be employed to produce a tone in a telephone receiver or other suitable sound producing device or the pick-up coil may be suitably connected to an oscillograph by which a visible record will be made of the wave produced in the coil or the pick-up coil may be connected to a harmonic analyzer by which the wave produced will be analyzed as to its various components.

In the preferred form of this invention a magnet structure is attached to and rotated by the member under test past a stationary inductor coil and the magnet structure is so designed that the voltage induced in the coil will be of pure sinusoidal form, when there is no variation in the cyclic rotation of the member under test.

Figure 2:
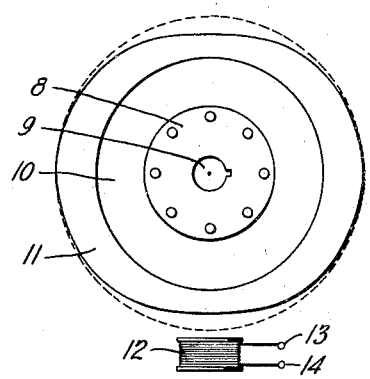
Figure 1:
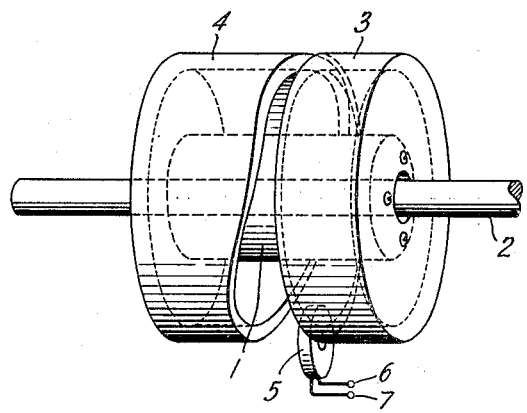
Figure 3:
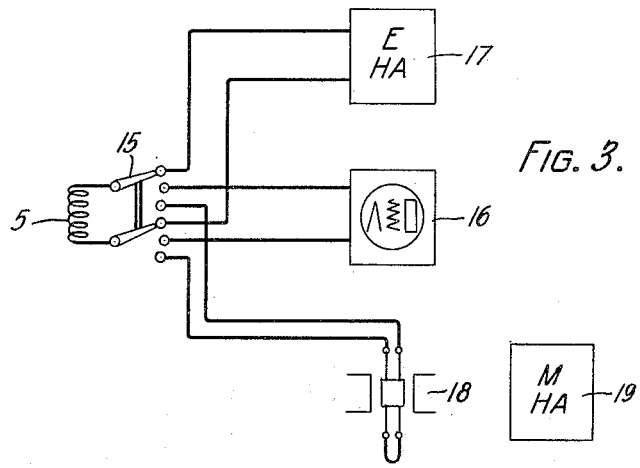

Two designs of apparatus by which the object of this invention may be accomplished are shown in the attached drawings in which Fig. 1 is a plan view of a magnet structure which may be attached to a rotatable shaft and Fig. 2 is a magnet structure which may be placed on a flat rotatable surface such as the turntable of a phonograph. Fig. 3 is a schematic showing in conventional form, means by which notation may be made of the wave produced, a visible record obtained of the wave form and analysis made of the wave as to its various components.

In Fig. 1, 1 is a tubular shaped permanent magnet mounted on a shaft 2 of non-magnetic material which may be coupled in any practicable manner to a shaft the cyclic rotative movement of which is to be tested. Carried by the permanent magnet 1 are pole pieces 3 and 4 which are attached to the ends of the permanent magnet 1 and are cup-shaped with the open ends adjacent. The cup-shaped pole piece 3 is of even depth all around while the cup-shaped pole piece 4 is of uneven depth being so shaped that when placed adjacent the pole piece 3, a varying air gap is obtained. Held stationary in the air gap between the pole pieces is an inductor coil 5 with leads 6 and 7 which may be attached to a telephone receiver or other recording device.

When the shaft 2 and the magnet structure, comprising the permanent magnet 1 and the pole pieces 3 and 4, is rotated by the shaft under test, the lines of force in the rotating magnetic field are cut by the inductor coil 5 and an electromotive force is induced in the inductor coil 5 which will produce a tone in a telephone receiver or will actuate whatever recording device it is connected with. The magnet structure is so designed that for an unvarying cyclic rotation of the shaft a sound of a predetermined tone will be produced by the receiver or a wave of predetermined form will be produced in the recording device.

In Fig. 2, 8 is a flat disc of brass or other non-magnetic material with a central aperture 9 adapted to receive a shaft or pin such as the center pin of a phonographic turntable. Encircling and attached to the non-magnetic disc 8 is a ring shaped permanent magnet 10 and encircling and attached to the permanent magnet 10 is a soft iron ring 11 of varying width. Placed closely adjacent to the soft iron ring 11 and held stationary relative thereto is an inductor coil 12 with leads 13 and 14 which may be connected in a circuit containing a telephone receiver or other suitable recording device.

When the disc 8 and its attached magnet structure comprising the encircling ring shaped permanent magnet 10 and the encircling soft iron ring 11 is rotated by turning of the phonographic turntable or the rotatable structure under test, the air gap between the soft iron ring 11 and the stationary inductor coil 12 is varied, due to the varying width of the soft iron ring 11, and an electromotive force is induced in the inductor coil 12.

The soft iron ring 11 is so shaped that the electromotive force induced in the inductor coil 12 will be of a predetermined wave form if there is no variation in the cyclic rotation of the member under test. The electromotive force induced in the inductor coil 12 will, if the coil is in circuit connection with a telephone receiver, produce in the receiver a note of a predetermined tone. If the inductor coil 12 is in circuit connection with a recording device designed to make visible records, a record of predetermined wave form will be recorded.

It may be found desirable to amplify the wave induced in the inductor coil 5 or 12, whichever apparatus is being used in making the test, so that the tone in the telephone receiver may be more easily detected or the recording apparatus properly actuated. It may be found desirable to make an analysis of the wave produced as to its various components or it may be desired that a picture of the wave be made.

Means for accomplishing the above mentioned facilities are conventionally illustrated in Fig. 3 in which by a switching arrangement 15 the inductor coil 5 or 12 may be connected to either an amplifier 16 placed between the coil 5 and a telephone receiver to produce therein a more audible tone or the coil may be connected through switch 15 to an electrical harmonic analyzer 17 which will analyze the wave as to its various components. Also through the switch 15 the inductor coil 5 may be connected to an oscillograph 18 which will produce on a suitably scaled chart or screen a picture of the form of wave induced in the coil. From the wave picture obtained on the oscillograph 18, analysis of the wave as to its various components may also be obtained by use of a mechanical harmonic analyzer illustrated at 19.

Different types of magnet structures and different combinations of magnet structures and induction coils than those shown in the attached drawings may clearly be employed in determining variations in the movement of a rotating member during a complete cycle of rotation. This invention therefore is considered not to be limited to the particular construction shown but to include such other means for determining cyclic variations in a rotating member as come within the scope of the following claims.

What is claimed is:

1. Apparatus for determining variations in the cyclic rotation of a rotating member comprising a magnet structure to be attached to the rotating member, an electrical pick-up coil and apparatus brought into circuit connection therewith for visibly indicating the voltage waves induced in the electrical pick-up coil, the said magnet structure being so formed that for an unvarying cyclic rotation of the magnet structure a voltage wave of approximately pure sinusoidal form will be generated.

2. Apparatus for determining variations in the cyclic rotation of a rotating member comprising a magnet structure to be carried by the rotating member, an electrical pick-up coil placed in close proximity to the magnet structure and voltage wave analyzing apparatus in circuit connection with the electrical pick-up coil, the said magnet structure being so formed that a varying air-gap is obtained between the magnet structure and the electrical pick-up coil and the voltage wave induced in the electrical pick-up coil for one unvarying cyclic movement of the magnet structure will be of approximately true sinusoidal form.

3. Apparatus for determining variations in the cyclic rotation of a rotating member comprising a magnet structure to be carried by the rotating member, an electrical pick-up coil held within the field of the magnet structure and apparatus in circuit connection with the electrical pick-up coil to visibly indicate the form of the voltage wave generated, said magnet structure being so formed that a gradual variation in the air-gap between the magnet structure and coil is obtained during one cyclic rotation of the rotating member and for one unvarying cyclic rotation a voltage wave of approximately pure sinusoidal form is produced in the electrical pick-up coil.

4. Apparatus for determining variations in the cyclic rotation of a rotating member comprising a cylindrical magnet to be attached to the rotating member, cup-shaped pole pieces attached to the ends of the cylindrical magnet, an air-gap between the pole pieces, an electrical pick-up coil located within the air-gap and apparatus in circuit connection with the electrical pick-up coil for visibly indicating the form of the voltage wave produced, the said cup-shaped pole pieces so formed that the air-gap between them is of constant varying width throughout.

5. The method of determining variations in the cyclic rotation of a member which consists in moving by said member a portion of a magnet system having a constantly varying air-gap between the magnet and a pick-up coil and generating a voltage wave of sinusoidal form, recording the form of the wave produced and comparing with a substantially true sine wave to determine at what points there was any variation in the cyclic movement.

In witness whereof, I hereunto subscribe my name this 3rd day of February, 1928.

ARTHUR C. KELLER.